(12) United States Patent
Kara

(10) Patent No.: US 6,505,179 B1
(45) Date of Patent: Jan. 7, 2003

(54) VERIFYING THE AUTHENTICITY OF PRINTED DOCUMENTS ON UNIVERSALLY AVAILABLE PAPER STOCK

(75) Inventor: Salim G. Kara, Thornhill (CA)

(73) Assignee: Kara Technology Incorporated, Houston, TX (US)

(*) Notice: Subject to any disclaimer, the term of this patent is extended or adjusted under 35 U.S.C. 154(b) by 0 days.

(21) Appl. No.: 09/345,617

(22) Filed: Jun. 30, 1999

Related U.S. Application Data

(63) Continuation-in-part of application No. 09/324,241, filed on Jun. 2, 1999.

(51) Int. Cl.[7] .............................................. G06F 17/60
(52) U.S. Cl. ............................. 705/50; 101/71; 283/53; 283/71; 283/72; 283/73; 283/80; 283/81
(58) Field of Search .............................. 101/71; 283/53, 283/57, 58, 59, 71, 72, 73, 79, 80, 81, 100, 101, 103, 104, 105, 901, 903; 705/50, 75, 76, 401, 408

(56) References Cited

U.S. PATENT DOCUMENTS

| | | | |
|---|---|---|---|
| 3,890,599 A | | 6/1975 | Simjian .................. 340/149 R |
| 3,959,624 A | | 5/1976 | Kaslow ................. 235/61.11 E |
| 4,108,364 A | * | 8/1978 | Tanaka et al. ............... 235/419 |
| 4,649,266 A | * | 3/1987 | Eckert ......................... 235/432 |
| 4,723,212 A | | 2/1988 | Mindrum et al. ........... 364/401 |
| 4,791,281 A | | 12/1988 | Johnsen et al. |
| 4,872,706 A | | 10/1989 | Brewen et al. ................ 283/81 |

(List continued on next page.)

FOREIGN PATENT DOCUMENTS

| | | | |
|---|---|---|---|
| EP | 0600646 A2 | | 6/1994 |
| EP | 0699327 B1 | * | 3/1999 |
| GB | 2318324 A1 | | 4/1998 |
| WO | WO-97/14482 A1 | * | 4/1997 |
| WO | WO-00/73954 A2 | * | 12/2000 |

OTHER PUBLICATIONS

"Run Control for Ticket Unit Minimizing Ticket Wastage"; IBM Technical Disclosure Bulletin; Feb. 1, 1974, vol. 16, No. 9. pp. 2998–3001.*

"Dataproducts: Dataproducts awarded Industrial Design excellence commendation for ATB printer"; Business Editors, Aug. 25, 1987.*

"Technologies match travelers, luggage (New bar code system from Exigent matches airline passengers liggage to tickets throught bar codes; system being used at airports in six US cities)"; Automatic I.D. News, Aug. 1997, vol. 13, No. 9, p. 1.*

"Tickets.com to Invest in Superior In–Home Ticketing Technology"; Business Wire, Feb. 17, 2000, p. 0025.*

*Primary Examiner*—Edward R. Cosimano
(74) *Attorney, Agent, or Firm*—Fulbright & Jaworski L.L.P.

(57) ABSTRACT

Universally available preprinted forms are used in a general purpose printing device to allow for the subsequent verification of the authenticity of a printed document such as a ticket, stamp, check, or money order. In operation, the user accesses the seller of the goods/services and during an information exchange with the seller there is inputted at least a portion of the preprinted data from the form. The seller then uses this information to formulate a printable control indicia which is then printed on the form at the user's location. When the form is subsequently presented to the seller, for example when the user uses the form he/she printed, the preprinted portion of the form is used to obtain a decipher key which in turn is used to decipher the control indica. If desired, a special security marking may be associated with the form for additional security. Inability to decode the control indicia indicates that the printed material on the form may not be authentic. A vending machine is shown in one embodiment.

70 Claims, 10 Drawing Sheets

U.S. PATENT DOCUMENTS

| | | | |
|---|---|---|---|
| 4,949,256 A | 8/1990 | Humble | 364/401 |
| 5,010,240 A | 4/1991 | Sheldon | 235/382 |
| 5,317,135 A | 5/1994 | Finocchio | 235/375 |
| 5,398,932 A | 3/1995 | Eberhardt et al. | 273/138 A |
| 5,432,506 A * | 7/1995 | Chapman | 705/44 |
| 5,489,096 A | 2/1996 | Aron | 273/138 R |
| 5,598,477 A * | 1/1997 | Berson | 380/51 |
| 5,671,282 A | 9/1997 | Wolff et al. | 380/25 |
| 5,673,320 A | 9/1997 | Ray et al. | 380/25 |
| 5,873,605 A | 2/1999 | Kaplan | 283/71 |
| 5,884,277 A | 3/1999 | Khosla | 705/14 |
| 5,935,000 A | 8/1999 | Sanchez, III et al. | 463/17 |
| 5,949,042 A | 9/1999 | Dietz, II et al. | 235/375 |
| 5,953,709 A | 9/1999 | Gilbert et al. | 705/35 |
| 6,111,953 A | 8/2000 | Walker et al. | |
| 6,170,744 B1 * | 1/2001 | Lee et al. | 235/380 |
| 6,212,504 B1 * | 4/2001 | Hayosh | 705/64 |
| 6,223,166 B1 * | 4/2001 | Kay | 705/26 |

\* cited by examiner

FIG. 2

VERIFYING THE AUTHENTICITY OF PRINTED DOCUMENTS ON UNIVERSALLY AVAILABLE PAPER STOCK

RELATED APPLICATIONS

The present application is a continuation-in-part of copending U.S. patent application, Ser. No. 09/324241 filed Jun. 2, 1999, entitled "VERIFYING THE AUTHENTICITY OF PRINTED DOCUMENTS" incorporated by reference herein.

TECHNICAL FIELD

This invention relates to electronic commerce in general and in particular to a system and method for establishing the authenticity of a past electronic communication at the point of the consummation of the commercial endeavor which is the subject of the electronic communication, and more particularly to a system and method for allowing valuable documents to be printed on universally available paper stock.

BACKGROUND

Electronic commerce is everywhere now. People are using the Internet, as well as other remotely accessible locations, such as kiosks, to order goods and/or services. Some of these services require verification of prior payment and/or reservations at the time the service is being offered which typically is sometime after the actual purchase (or reservation) was made. For example, assume a person desires to reserve a seat on an airplane, or a room in a hotel, or a rental car, or a seat in a theatre, all from a remote terminal. Typically, that person would get into communication contact with a reservation system. This communication can be with a live person at the selling end or could be with a computer acting in an interactive mode or a combination of the two. The reservation would be made and arrangements would be made to pay for the reservation. Then the problem arises; how does the purchaser demonstrate to the gatekeeper at the airline (or to the rental car gatekeeper; or to the theatre usher or the postal delivery service) that the service has been paid for?

The obvious answer is that a ticket, stamp or other indicia of the transaction, is printed at the purchaser's terminal and that printed ticket is used to identify that the services have been paid for. That might work when the paper stock that the receipt information is printed on is closely guarded and very distinctive. It will not work for obvious reasons where general purpose printers and widely available pare stock are used to print the receipt at the purchaser's premises.

In situations where valuable documents such as stamps, travelers' checks and the like, are sold, it is important to keep the unsold stock in a safe place to avoid theft and fraud. Thus, those types of valuable documents are obtainable only at specific limited locations and not universally available for purchase.

If electronic commerce is to flourish then it is mandatory to have an arrangement whereby the purchaser can obtain immediately upon purchase a printed verification of the transaction in a manner which allows for universal printing on universally available stock while still allowing the printed receipt to act as a final verification of authenticity at the point where the actual services are rendered.

SUMMARY OF THE INVENTION

These and other objects, features and technical advantages of my invention have been achieved in one embodiment where a system and method is utilized for establishing a commercially available partially preprinted form where the form has printed on it information used by the service seller during the initial transaction communication period for establishing integrity control for subsequent verification. In one embodiment, the form is available to any purchaser for use with any general purpose printer operable in conjunction with a PC or other communication/computing device, including so called "dumb" terminals. This form is advantageously preprinted with both human readable data and machine readable data. As will be seen, the machine readable data, which I will call an indicia, contains key information which serves to help decode material that is subsequently printed on the form under control of the central validating system.

In operation, the purchaser enters into an interaction communication with the seller of the service. This may be, by way of illustration, from the purchaser's PC at his/her home via is the Internet to a web site maintained by the seller. The user has obtained one or more preprinted paper forms from a supplier of forms. The weight of the paper is not critical and the forms may be any weight stock. The user inputs the human readable data from the exact preprinted form that the user intends to use. This input can be by verbally reading the data or by scanning the data or by any other system. In situations when there is no human readable material preprinted on the form, the user would scan in the machine readable portion. Some portion of the preprinted data is unique to the exact form selected by the user at that time.

The seller, upon receipt of the unique data from the user pertaining to the selected form, verifies that this exact form identification number has not been previously used. Since each preprinted form has a unique identification code, this initial screening process insures that a copy of the preprinted form is not being used. The seller then uses the unique identification number to establish an encryption code for printing on the form a machine readable security indicia. It will be this security indicia that will subsequently be used in conjunction with the original preprinted indicia to verify the authenticity of the information to be printed on the form. The seller then sends information to user so that the user's printer will print on the form all of the information that will be used by the purchaser to subsequently obtain the service.

The form that is used could be, for example, a sheet of paper divided into sections with a glue backing. The individual sections can be the size of a postage stamp (or other valuable document) and each section can (but need not) have preprinted data thereon. Each section then can be printed with information representing a value and the sections would be separated into individual stamps for use on envelopes.

For verification of the authenticity of each stamp, the original preprinted indicia from the form is read to obtain a decryption key. This key is then used to decrypt information stored in the security indicia that was printed at the time the remainder of the stamp information was printed. If the key is not present on the preprinted form, or if the key differs from the key assigned to that stamp in conjunction with the human readable data that was is inputted by the purchaser during the initial payment, then the data on the form will not be verified and the mail will be rejected.

Note that the printer can be any printing device for creating images on paper, or it could be a device for storing images which can later be displayed to obtain the goods and or services. For example, the printer can be part of a vending machine which, prior to each activation, only contains paper having on (or within) it preestablished data unique to that sheet of paper. This paper stock has very little intrinsic value. When a user desires postage (or a money order or any other document), money or credit is used and a sheet of the paper is printed as described above. The printed sheet now becomes a valuable document. In this manner a storekeeper need not maintain a large inventory of valuable stock (such as stamps or money orders) since the value is added only as needed. In the situation with stamps, this invention would reduce, or eliminate, the need for preprinting stamps, since one, two or a sheet of stamps could be printed when needed. Thus, the seller of the stamps (money orders or other document) need not maintain all of the possible denominations or variations of the documents and only need maintain the relatively valueless paper forms.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 2 shows the form of FIG. 1 having created thereon luggage tags and a boarding pass;

DETAILED DESCRIPTION

Figure 1:
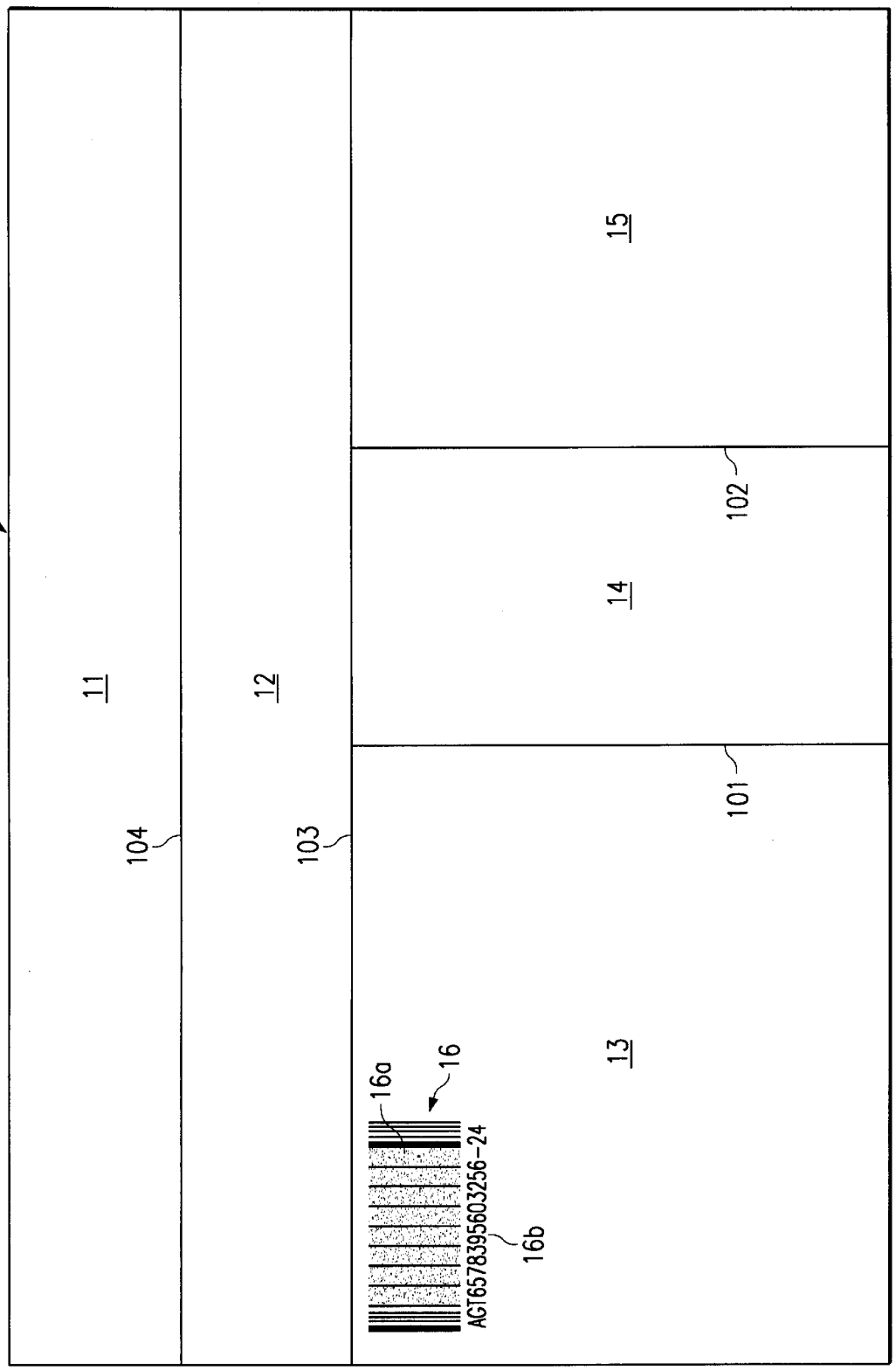
FIG. 1 shows a sample preprinted blank form.

Turning now to FIG. 1, form 10 is the original display media which, in one embodiment, can be ticket stock printed with indicia 16 thereon. Indicia portion 16a can be a machine readable portion of the indicia (which can be, for example a Universal Bar Code, an Intermec Corporations' Code 49, or a Laser Light System Inc.'s Code 16K, or any other type of machine readable code) and portion 16b is a human readable portion. Note that for the purposes of this invention the indicia can be entirely machine readable or entirely human readable, if desired. In addition, the human readable portion could be a different form of the indicia, such as bar codes that can be machine readable. In the embodiment, form 10 is divided into sections 11, 12, 13, 14 and 15 each separable by perforated lines 101, 102, 103, and 104. These lines can be traditional perforations, or they can be simple folds. In some situations there need not be any perforations or folds.

Figure 2:
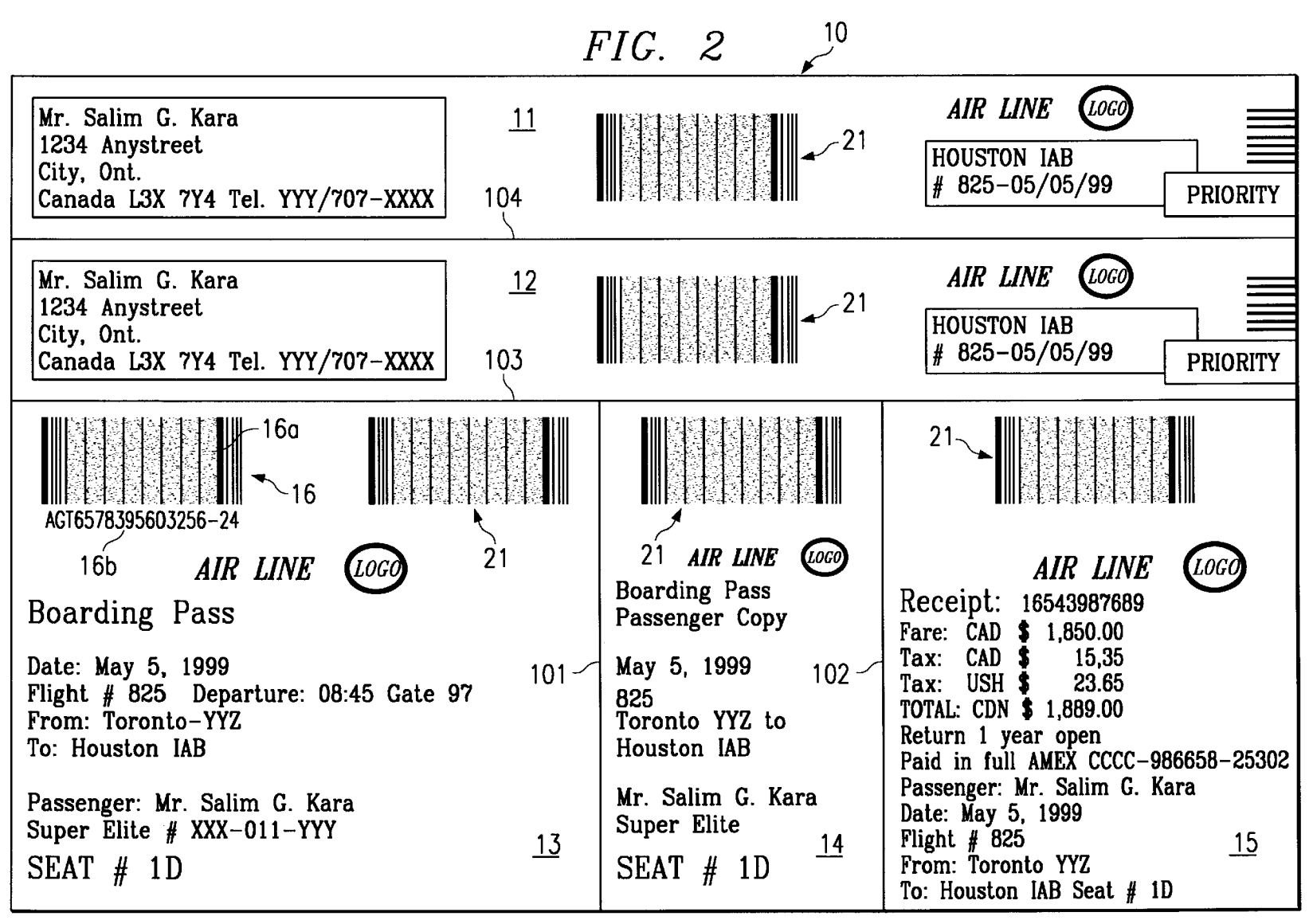

As will be seen in FIG. 2 for an airline ticket portion 13 of ticket stock 10 is printed with the necessary boarding information. In such a situation, section 14 would be the passenger's copy of the boarding pass, section 15 would be the passenger's receipt, and sections 11 and 12 would be the luggage tags that would be preprinted. Thus, the luggage tags can be removed from the printer and ticket stubs 13, 14 and 15 can be separated along the perforation lines. Paper on the backing of the ticket stub area (not shown) can be removed to reveal a portion which has a sticky substance thereon which would allow the tags to be placed in the traditional manner on the luggage to form a loop around the handle.

Figure 3:
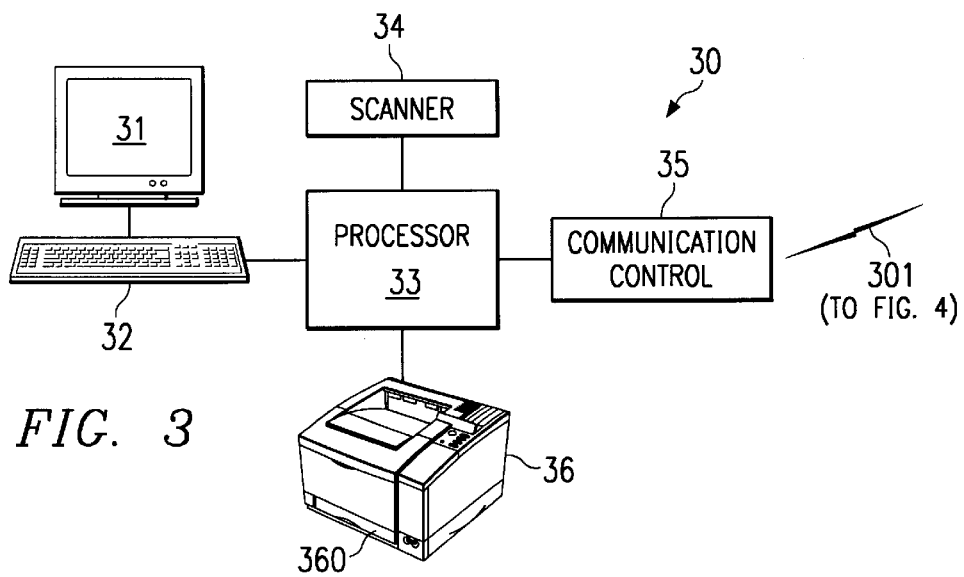
FIG. 3 shows a typical user workstation.

Turning now to FIG. 3, a user using system 30 who has obtained one or more portions of ticket stock 10 places a ticket form or a series of ticket forms 10 in paper tray 360 of printer 36 which is connected to processor 33, which in turn accepts inputs back and forth between keyboard 32, display 31, scanner 34 and communication control 35. The user then makes communication contact with a seller (FIG. 4) via communication control 35 and signal link 301. Signal link 301 could be wireless, wireline, or any other combination system. The internet can be used for this purpose or direct phone line connections combinations thereof In a typical situation, software would be controlled by processor 33 and the user of keyboard 32 and display 31 would interact with the seller at system 40 FIG. 4 to arrive at a desired flight, cost, time, seat assignment, return trip or intermediate stops. This would all be accomplished in a well known fashion, either verbally on both parts, or by one or both parties communicating without the intervention of a human on either of both sides. The user at system 30 and the seller at system 40 come to a meeting of the minds with respect to the payment and other terms. The user at 30, either verbally or via scanner 34 (which can be part of printer 36 if desired) reads off the human readable portion of code 16b shown in FIG. 1.

This data is communicated via link 301 to communication control 41 and processor 42. to Processor 42 operates in conjunction with data base 43 and determines whether the code that has just been received from the preprinted form is a valid code. This determination can be based upon several factors, one factor being that the code has never been used before, thereby ensuring that it at least appears to be unique to this form. Also, the verification can determine whether the code number is within an acceptable range for this user. Various other parameters can be checked. In one embodiment, processor 42 working in conjunction with data base 43, would know that the original machine readable indicia on ticket stock 10 portion 16a has contained within it a particular key which had been preassigned prior to the printing of the ticket stock. Processor 42 then utilizes a coding algorithm which is secret to it, but which is based on the key contained in the original printed indicia. Utilizing this information, processor 42 formulates a printed message which is transmitted via communication channel 301 to FIG. 3 system 30 and via communication control 35 to processor 33 which then controls printer 36 to print the ticket such as is shown in FIG. 2.

The stock could be preloaded in vending machine 90 (FIG. 9) and when a user places the proper amount of coins, or uses a credit/debit card or smart card or establishes other credit, (and/or proper identity in some situations) vending machine 90 will initiate contact via communication control 99 with communication control 41 (FIG. 4) and, as discussed above, images will be formed on the stock. Data which has been prestored on the forms will be communicated to control 41 by scanning or otherwise electronically reading that data. The data and/or any required security image, can be in any format, including infrared, ultra-violet or fluorescent inks or the like, magnetic inks, magnetic or electronic embedding in the medium, isotope tagging, holographic marking, silicon chip implant, and other systems for storing data. Any of the marking systems can be human readable, machine readable or combinations of the two. Also, the data can be stored in a manner where it verbally communicates to the seller upon being stimulated. In the preferred embodiment, the data to be communicated to the seller is human readable, or bar code readable, while other data or images are embedded on the paper stock for security purposes. This security image can be, for example, any of the above types. Some of the preestablished data could be images which are visible or understandable to humans while other parts of the data can be readable only with special systems.

Figure 9:
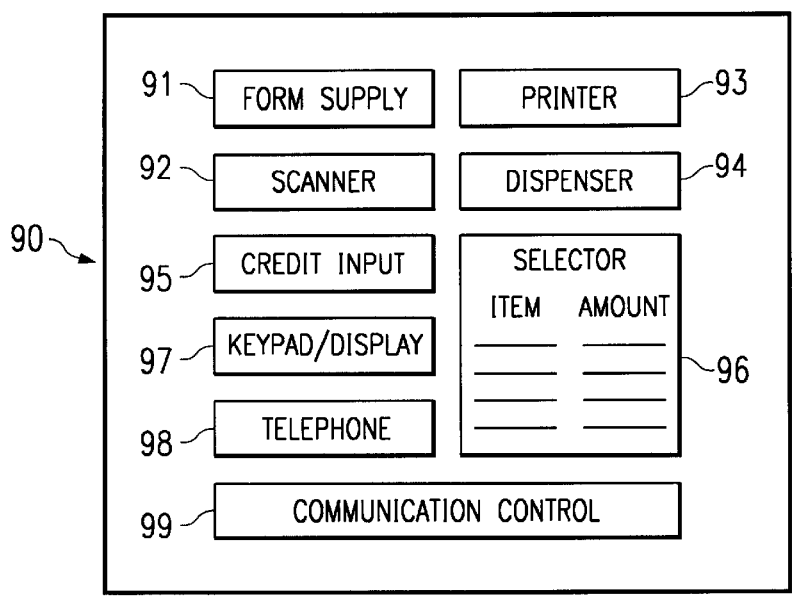
FIG. 9 shows a system and method of this invention arranged in a vending machine configuration and FIG. 10 shows the operation for a system and method of this invention for controlling third party printing.

A separate data base (not shown) could be used to transmit certain data to be used to control the indicia that will ultimately be printed. As shown in FIG. 9, form supply 91 could hold different forms for different uses, such as postage stamp stock, airline ticket stock, sports ticket stock, or check (postal money order) stock. The number of such form types is unlimited, such as, for example, certified checks, cashier checks, bank drafts, letters of credit, legal documents, legal certificates, diplomas, passports, birth certificates, visas, drivers' licenses, social security cards, insurance cards, travel vouchers, meal vouchers, food stamps, prescriptions ($R_x$) from doctors, stock, bonds, or any other form that requires hard copy authentication or validation (other than cash) at a point in time other than when the document is created. The type of stock used will be appropriate to the ultimate use, but can contain forms as elaborate as necessary.

Figure 4:
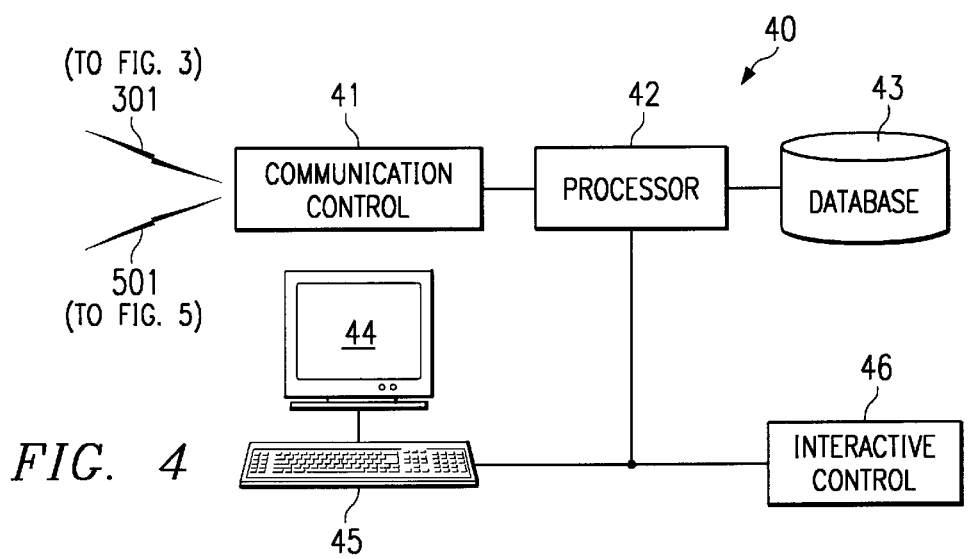
FIG. 4 shows a typical seller work system.

The user establishes credit, via input 95, and makes his/her selection via either selector 96 or interactively via keyboard/display 97 (or via telephone 98). The selection will include the name of a payee, theater, airline, sports event or other data appropriate to the selected document type. Once the selection is made, the proper form (or a universal form) is presented to scanner 92 so as to transmit the unique code to the seller's data base (FIG. 4) as above discussed. Once this is accomplished and a verification of authenticity is made, the form is available to printer 93 so as to print thereon the images received from the seller (FIG. 4). Once finished, the now valuable document is dispensed to the user via dispenser 94. Note that if a sheet of stamps is ordered, the user would specify what denomination or denominations if more than one denomination is to be printed on a sheet. When the stamps are printed, they can be used individually as postage.

Note that the printed ticket in FIG. 2 has a second indicia 21 which is machine readable similar to indicia 16a and decodable only by utilizing the key which is contained in indicia 16a. Indicia 21 has been especially created by processor 42 in FIG. 4 under control of the previously transmitted data from the buyer and will serve to verify the authenticity of the ticket when the user arrives at the terminal for boarding the airplane, or when the user, in another situation, arrives at a theater. The printed control indicia is compared using the embedded key from the original indicia to decode the printed indicia to authenticate the validity of the ticket. As previously discussed, this can be used for renting cars (or any other transaction) where the actual information is given to the user preprinted ahead of time at the user's location and the printed indicia is used to allow the car to be removed from the lot via the mechanism above described. Note that more than one control indicia, or key indicia, can be printed (or imbedded) on any form.

Figure 5:
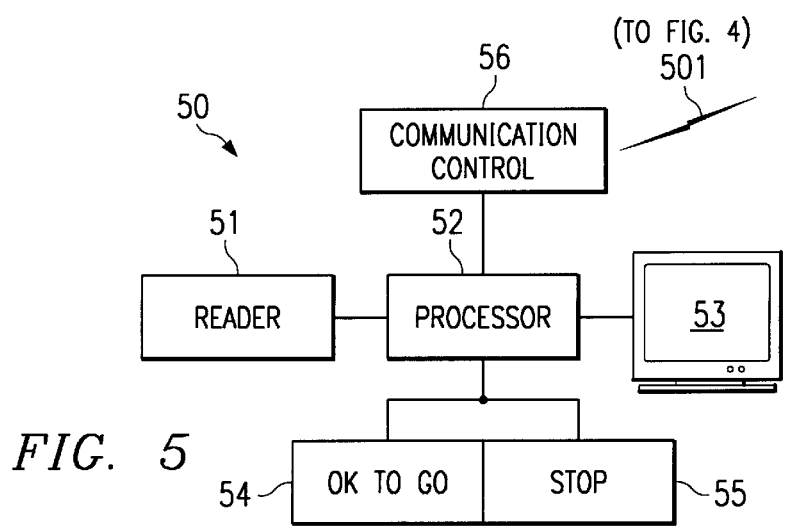
FIG. 5 shows a typical point of sale verification system.
Figure 6:
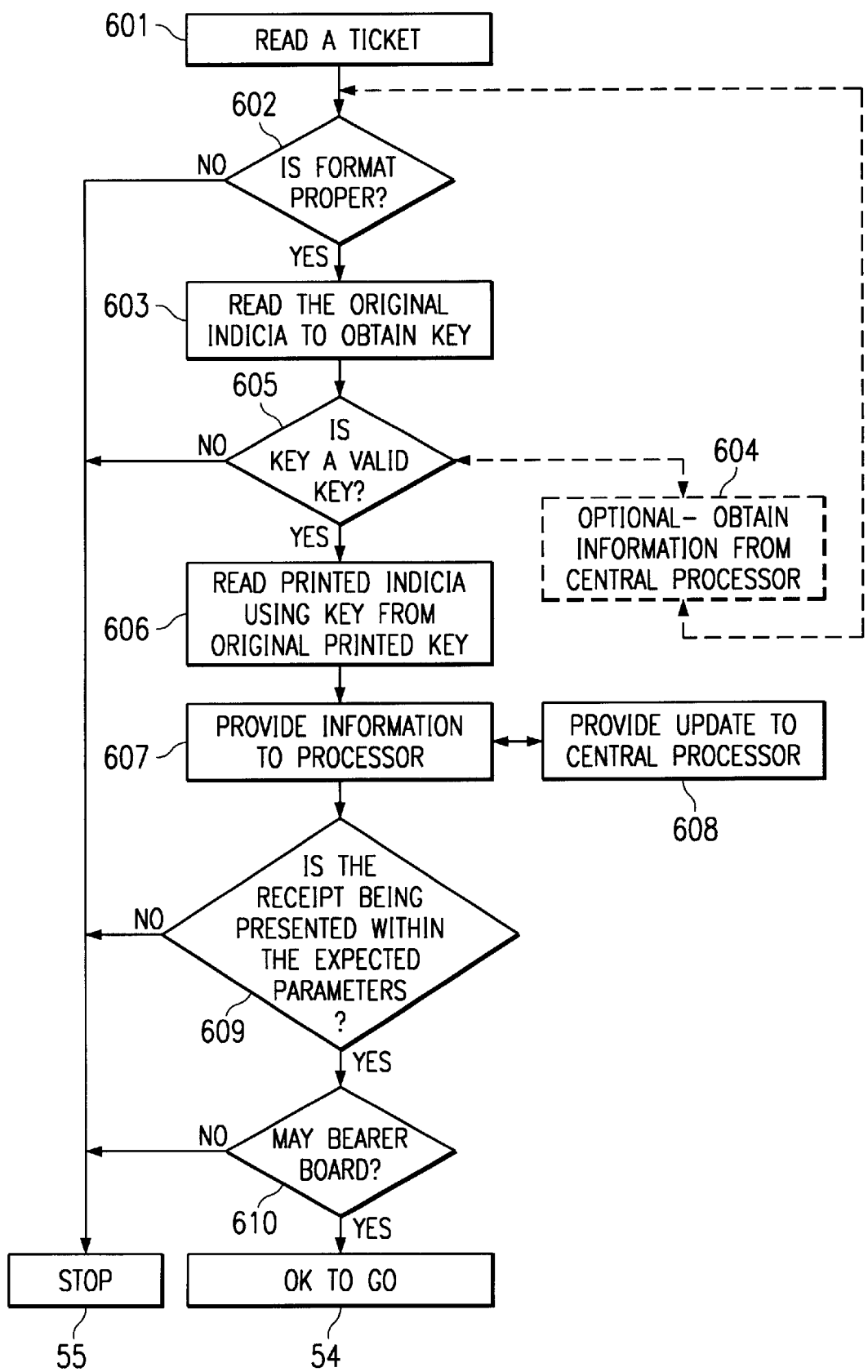
FIG. 6 shows a simple algorithm for authenticating the printed form.

Turning now to system 50 of FIG. 5, when the user arrives at the point of utilization, i.e., the boarding gate of the airline, bus station, train station, or at the exit gate of the rental car agency, or at the entrance to the theater (so that the preprinted commercial transaction is about to be authenticated and the services actually rendered based upon a preestablished commercial transaction between the parties) (or in the case of a stamp, when the mail piece on which the stamp is placed arrives at a mail distribution center), reader 51 reads the information that is on the preprinted ticket (stamp or money order form) including the original indicia 16a and the new indicia 21. Also, if a security image which had been preestablished on the form is expected, that security image will be checked via box 602 (FIG. 6). This information is provided to processor 52 which then extracts the key from the data contained in indicia 16 for decoding the data in indicia 21, thereby enabling a determination that the passenger is okay to go 54, via display 53, or that the ticket is not valid 55, via display 53. Processor 52 can transmit and receive information via communication control 56 overlink 501 to communication control 41 in FIG. 4. The purpose of this link can be two fold if desired. 1) When the initial transaction is consummated, processor 42 can operate to transmit the information via link 501 to processor 52 and its database (not shown) indicating that certain information has been printed on various tickets. This would serve as a further backup to the decision process at the time of offering of the services since the indicia that has been printed is expected at that period of time from the information given at the time of the booking. For example, seat information and other information including information pertaining to the printed indicia 21 can be communicated to processor 52 so that when printed indicia 21 is presented, processor 52 can utilize its intelligence to determine the validity of the printed indicia to further check that copies are not made and that the services are not given to the wrong person or to many people utilizing the same numbers.

This system cuts down on fraudulent operations and even if an unscrupulous operator were to make copies of a printed ticket, only one such ticket could be processed at processor 52 because the second one would block since it would no longer be valid for transport or for the rendition of services. Thus, the user of the ticket stock would be in no different position than if the user were to obtain a ticket and have somebody steal the ticket and/or copy the ticket, since control indicia 21 would only have been printed upon the consummation of a commercial transaction, which implies that a means of payment had been agreed upon between the parties.

Turning now to FIG. 6, a simple flow chart is shown to show the operation just described and box 601 of the ticket is read and box 602 determines if the format of the entire ticket including indicia 16a and 21 is accurate and proper. In this respect there can be, if desired, interaction between information at the local service rendering position and the central data base box 604. If the format is wrong, the transaction is stopped via box 602. If the format is proper, then the original indicia is read box 603 to determine the key which would be used to decode indicia 21 prior to such utilization of the key. The key is checked via box 605 to determine if it is a valid key. If the key is not valid, the transaction is stopped by proceeding to box 55. Again this validity check can be done in cooperation with information received from the central data base, if desired, via box 604. If it is a valid key, then the key is used to decode the information from the printed indicia box 606 which provides information to processor 607 which verifies the authenticity of the data on the remainder of the ticket and determines (optional) if the parameters (time, date, sequence, etc.) are correct for the passenger of this receipt box 609. If receipt being presented is not within the expected parameters, the transaction is stopped by proceeding to box 55. If receipt being presented is within the expected parameters, the transaction continues to box 610. Again this information can be used to update the central processor 608 if desired to maintain central control. Box 610 controls whether the bearer may board or enter the theater or remove a car from the lot or any other commercial transaction controlled by the ticket or other display utilized at the time of the actual rendering of the service or the obtaining of the goods where the goods or services have been paid for in a prior arranged commercial transaction. If the bearer may board, the transaction proceeds to box 54. If not, the transaction is stopped via box 55.

Note that while we have been discussing airlines and rental cars and theaters, this same procedure can be used to obtain merchandise at one point in time where the merchandise has been preordered and prepaid for and receipts generated at a home or office at a general purpose printer using special paper stock which has been printed on it (or otherwise associated therewith) a unique identification code. These codes have been used to create a separate indicia which is coded with a decoding being controlled by a key obtained from the originally printed indicia. Also note that while we have been discussing material forms, this system could work just as well with an electronic display device visual or otherwise where certain portions of the data can be electronically coded and subsequently decoded utilizing a key which is contained in the original information.

Figure 7A:
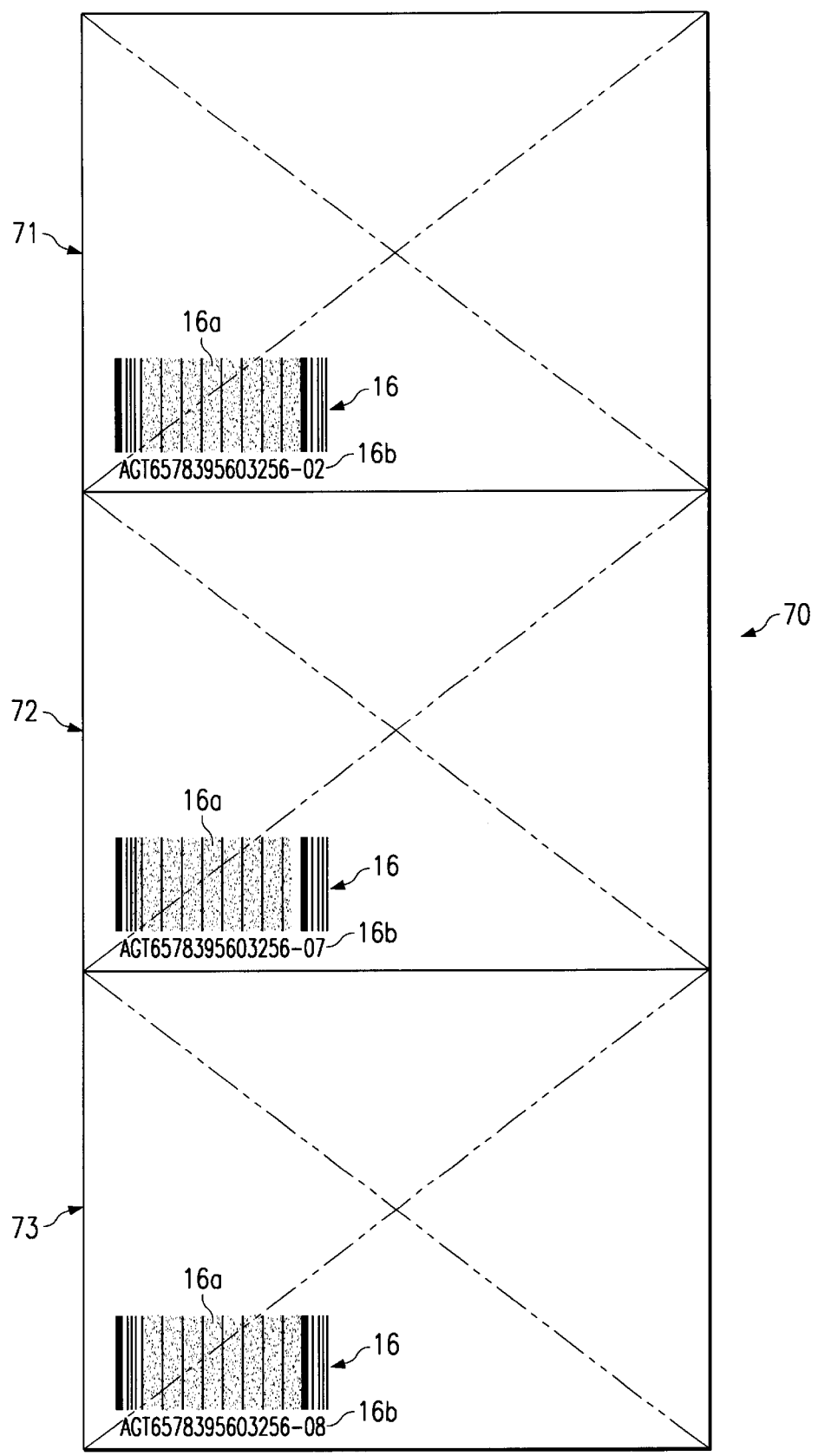
FIGS. 7A–7C show a series of preprinted blank forms.
Figure 7B:
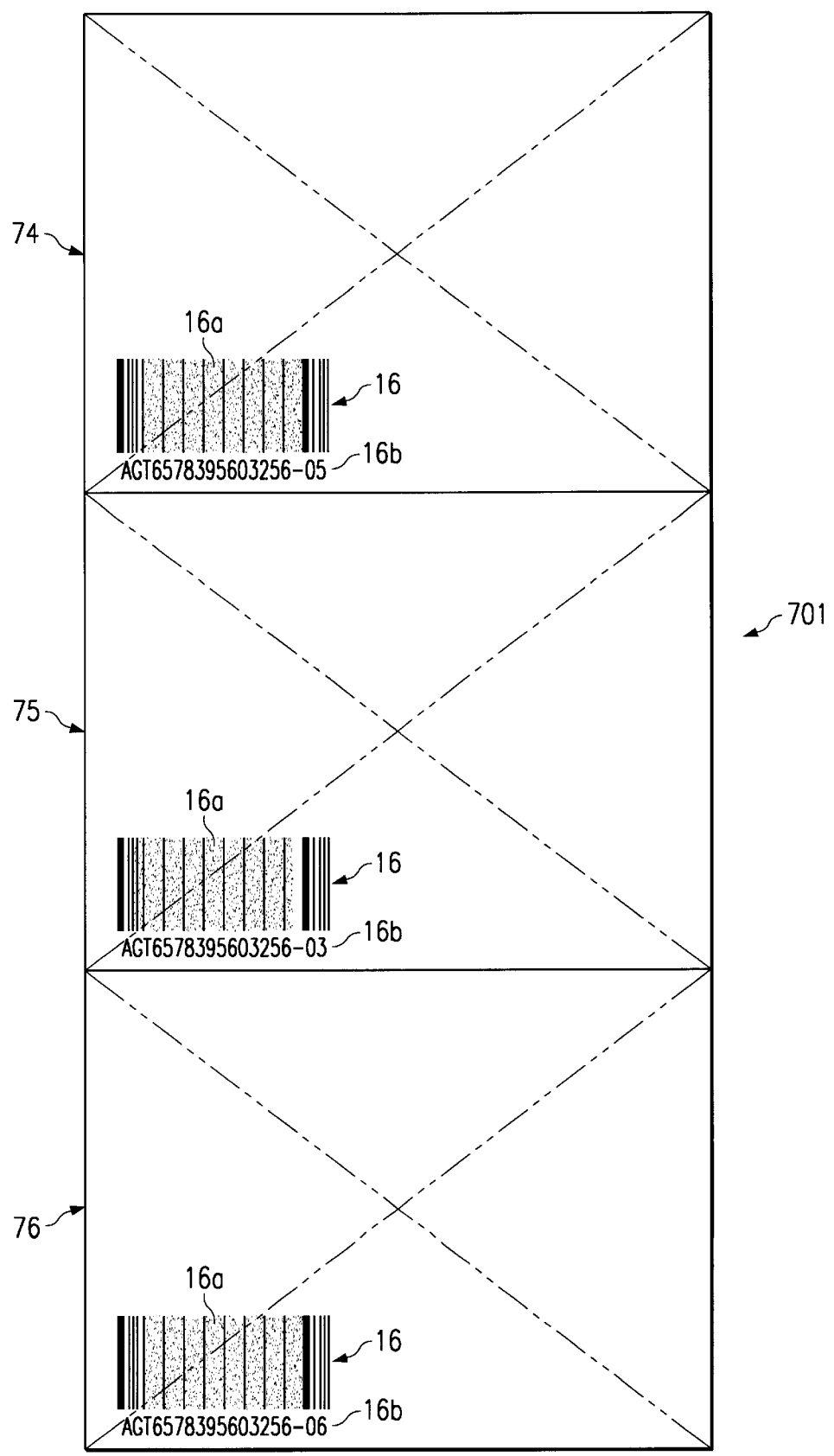
Figure 7C:
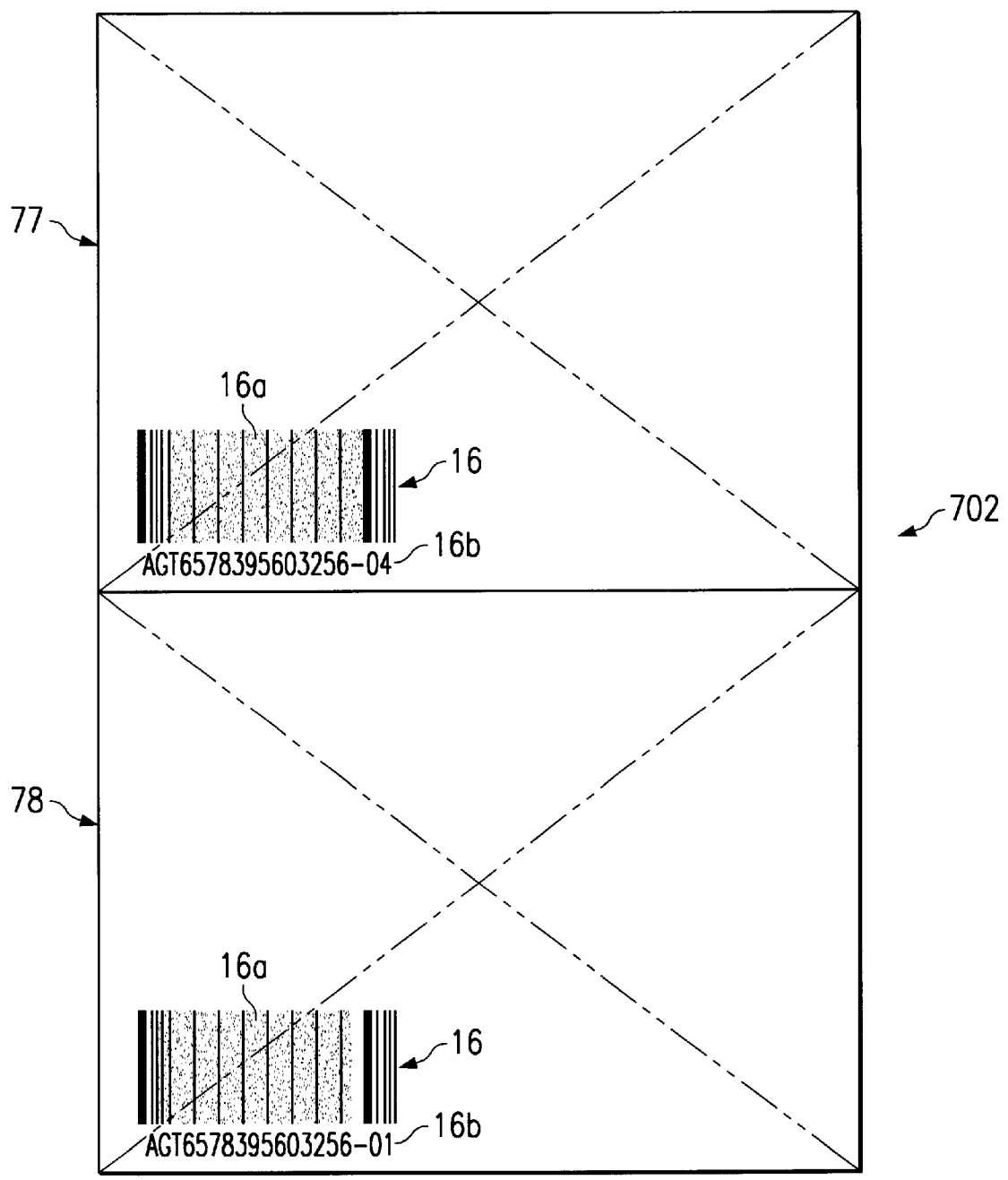
Figure 8A:
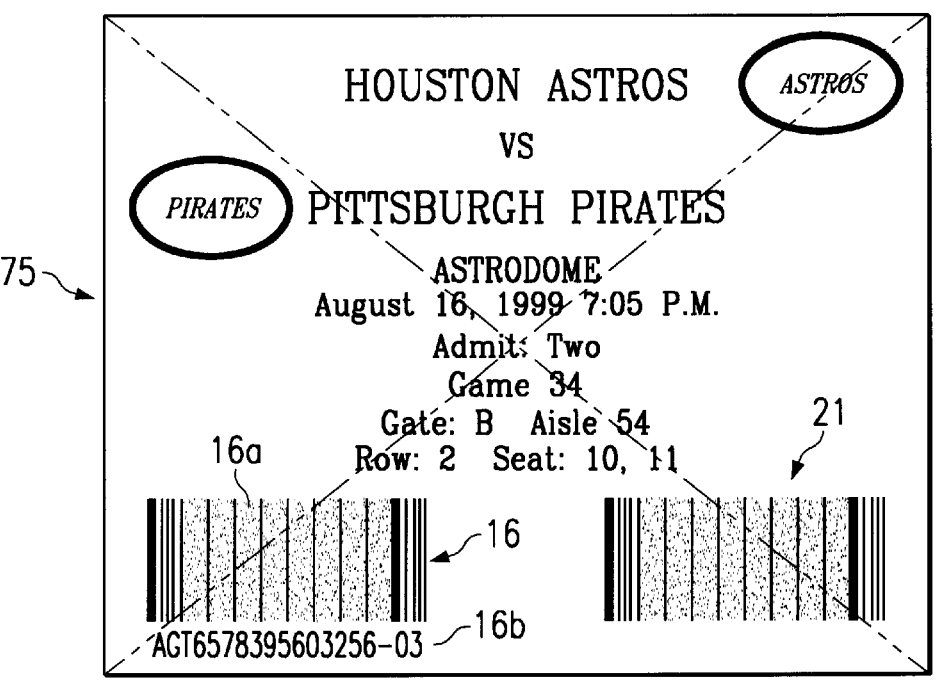
FIGS. 8A–8D show tickets printed using the blank forms of FIGS. 7A–7C.
Figure 8B:
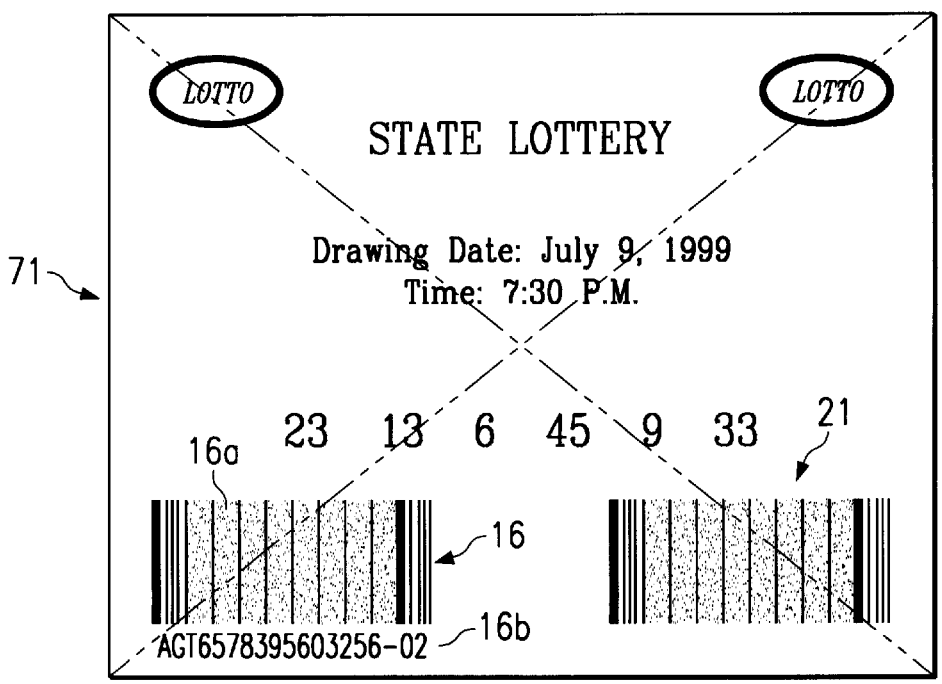
Figure 8C:
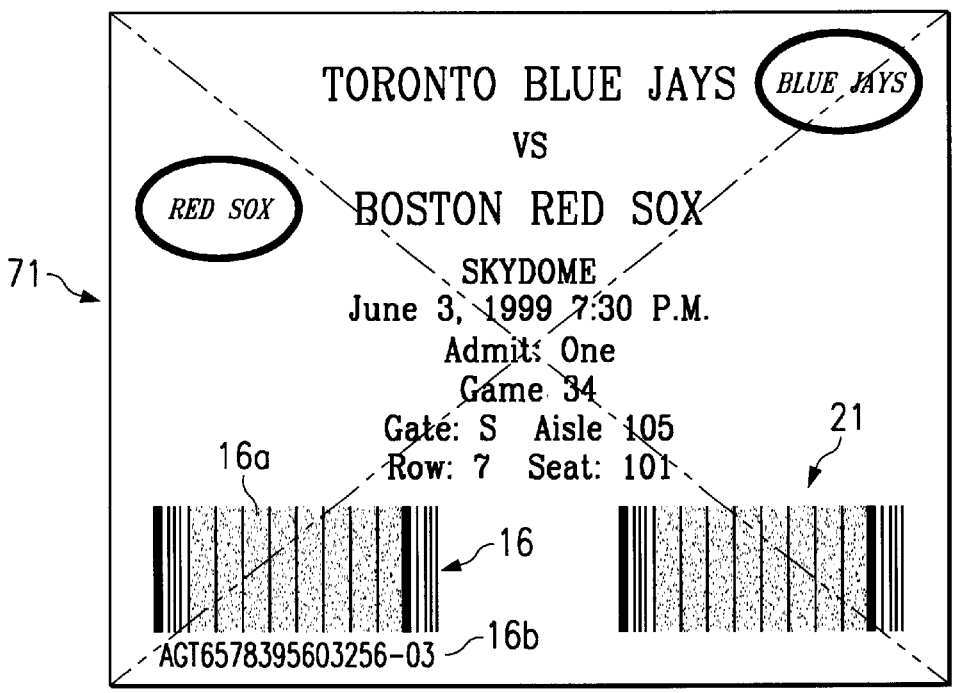
Figure 8D:
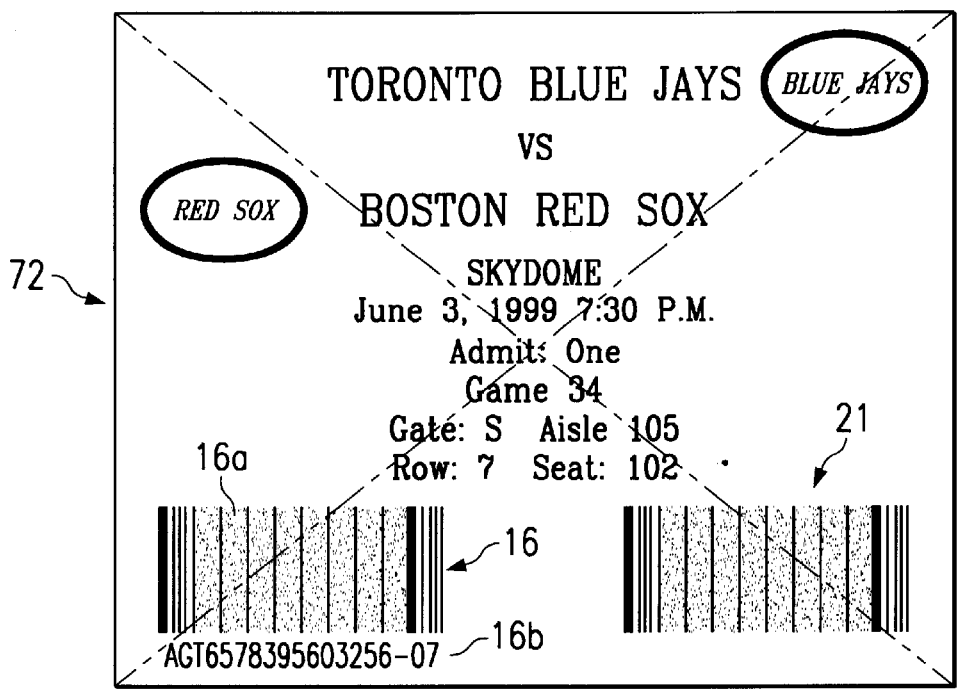

FIG. 7A shows blank stock 70 which has been divided into three sections 71, 72, 73 each having printed thereon an indicia 16, which has a machine readable part and a human readable part. Note that the last two digits in our example 02, 07 and 08 are individual to each form with respect to sections 71, 72 and 73 and need not be in sequential order. These individual last digits could signify the actual sheet number of a form 70 or the individual section number. Blank stock 701 of FIG. 7B has three more sections 74, 75, 76 and blank stock of 702 FIG. 7C has an additional two sections 77, 78. These sections could all be part of one long roll of forms or could be different form sheets with different numbers of blanks thereon.

Turning to FIGS. 8A, 8B, 8C and 8D, a user having a sheet of blank form 70 inserted in the user's printer may order a series of tickets for different sporting events, theaters, lotteries and the like. The user upon connection to a common server which serves several different such sporting events may order and pay for the tickets which will printed as discussed above. These are shown in FIGS. 8A, 8B, 8C and 8D.

Note that indicia 16 can be printed on the sheet and can include either or both machine readable and human readable sections and also this mark may be presented to the users in ID various forms, one of which could be watermarks, or, as discussed above, any other type of data storage if checks were to be printed, built into the paper which could be uniquely identified if desired. They would then have printed on them the proper logos and markings for signature by the user when the user utilizes the printed "check" to purchase goods or services. The check would have printed on it the printed indicia as well as the initial indicia so that the acceptor of the travelers check could, if desired, run the check through a scanner or other reading device to determine the authenticity of the check. For postal money orders, or other commercial paper, the payee could be printed on the check, if desired. Note that each sheet (or form) can have a single block of data for the whole form or may have different data bits for each section of the form. When a single data system is used, each section of the form can still have different control codes printed thereon if desired. However, preferentially, each section should have associated therewith a unique preestablished control code.

Note also that when a consumer is ordering tickets, the ordering need not be from the same seller but may be from a plurality of sellers. For instance, the user may call for baseball tickets to one seller, football tickets to another and perhaps call for tickets at a distant city. In each case, the seller would utilize the information transmitted by the seller which is unique to the ticket stock currently in the printer. This information would be communicated by the seller's system to a central database to determine what physical position on the ticket stock this particular ticket should be printed and to also determine whether the unique number identified with this ticket has been previously utilized. Thus, user can have printed at their own printers tickets for many diverse events using this system.

Note also that while in the embodiment, the purchaser transmits the unique data pertaining to the stock material to the seller, a system could be devised whereby the unique information is sent by a third party in response to a trigger supplied by the user. This trigger could be automatically generated by the printer scanning the paper and accessing a remote or local data base, or by the data base keeping track of the user's use of the stock and sending the next number in a sequence. For some users (particularly high volume users) the seller could keep track of the anticipated next number in a sequence of preestablished numbers so that the user need not transmit any information. The unique code on the stock could, for example, be printed at the time of the transaction under control of a source other than the seller.

Also note that where the term ticket is used, I mean any indicia generated as discussed above, which represents a prior transaction, including, by way of example, stamps, checks, money orders, receipts, food stamps and the like, and when the term credit value is used, I mean any valuation at the initial point of user contact with the provider of the service/document and can, for example, include the user's identity, a payee identity, an amount to be printed on a document, a third party identity and/or a user provided code.

While I have been discussing the creation of a valuable document at a user's location where the document stock is under the control of the user who is creating the document based on data preestablished with respect to the document, the system and method of my invention can be used in any number of configurations. By way of example, let us assume that there is created a trusted intermediary who a user has credit with or with whom a user feels comfortable in giving credit card or banking information. This trusted intermediary can be a bank or any business set up to process commercial transactions.

Let us then assume that the user desires to pay for some service or some goods purchased remotely. Such a situation occurs when the user shops on the Internet, or wins a bid at a bid website or when the user buys goods over the telephone. The problem then arises as to how is the buyer to pay the seller for the goods or services he/she bought? Credit cards come to mind in this situation but many people do not believe that it is sound to practice to distribute their credit information in a relatively open forum. This same problem arises when a person (or organization) attempts to deliver a valuable document, such as a driver's license, owner's title certificate, food stamps, or stock and the like.

Figure 10:
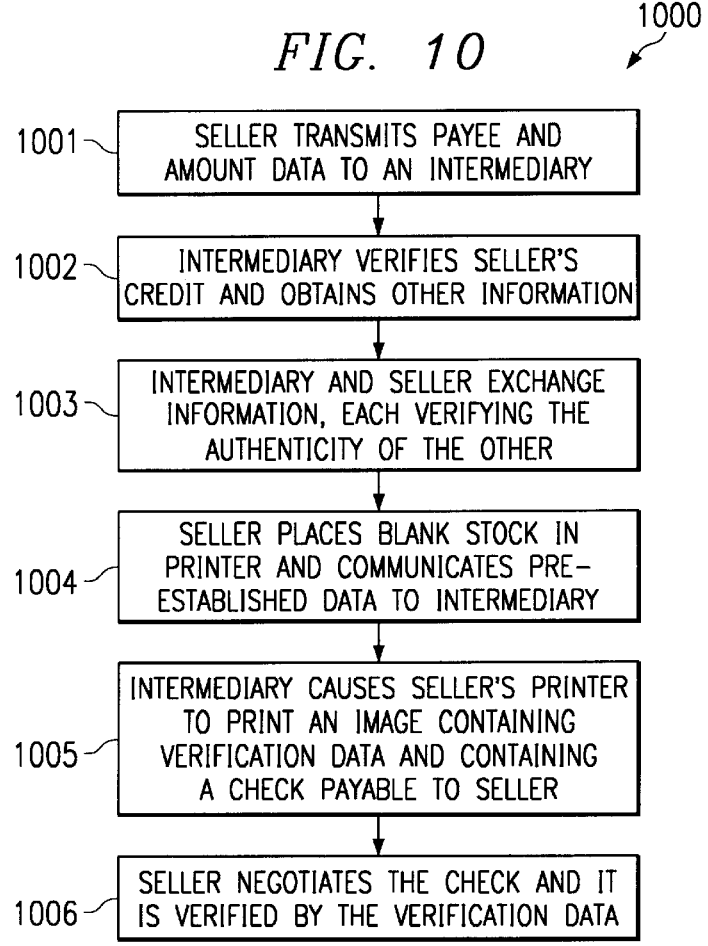

Using the principals and concepts of my invention, as shown in FIG. 10, the buyer would contact the trusted intermediary (1001), perhaps by Internet, direct electronic connection, telephone or via any other communication vehicle. They buyer would communicate the amount of the transaction, the payee information and/or other pertinent information to the intermediary (1002). The intermediary would then debit the user's account, or otherwise satisfy itself that it will be paid or that the transaction is legitimate. The seller then contacts the website (or otherwise comes into communication contact with the intermediary) of the intermediary (or the intermediary could contact the seller) and identifies itself. The parties then mutually satisfy themselves that the other party is authentic (1003). When the intermediary is satisfied that the seller and the payee are one in the same (or that the proper party is at the destination) the seller installs check paper blank (except for the preestablished data and perhaps a security tag) stock in a printer local to the seller (1004) and the seller then communicates certain information preestablished on the check paper back to the intermediary. The intermediary then causes the seller's printer to print the check with the payee's name on it in the amount specified by the buyer (1005). When the check that is printed at the seller's location is presented to an institution for payment the special data printed on the check is decoded using at least a portion of the originally preestablished data on the then blank document stock (1006). Note that the intermediary and the seller can be connected even before the buyer transmits the information so that the intermediary can cause the seller's printer to print substantially concurrent with the receipt of the information from the buyer. In this manner the intermediary could keep track of the sequence of form usage at the seller's location, thereby knowing without further communication the preestablished data associated with the next blank form.

While I have discussed a few scenarios many other similar scenarios exist for delivering a valuable document from one person to another in a manner such that the authenticity of the delivered document is ascertainable. For example, this system could be used to deliver car titles from a state registration agent to a dealership, where the title is in the name of the car owner.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A vending machine adapted to create an indicia, said vending machine comprising:

means for interacting with a user to establish a credit value on a document, a desired document type and at least one value of said document;

means for accepting from a particular printable stock associated with said selected document type data unique to said particular form;

means for comparing said accepted data with data stored in a data base to determine if said unique data had been previously accepted; and means operable under control of said comparing means for providing a set of coded control data for printing on said printable stock, said control data being decodable, in part, under control of key data associated on said printable stock with said unique data.

2. The invention set forth in claim 1 wherein said data base is common to a plurality of physically diverse accepting means.

3. The invention set forth in claim 1 wherein at least a portion of said unique data is preestabhished on said printable stock.

4. The invention set forth in claim 3 wherein said preestablished data includes at least one of the following:

conventional ink, infra-red ink, ultra-violet ink, magnetic ink, isotope tagging, fluorescent ink, holograph marking, silicon chip implant or watermarking.

5. The invention set forth in claim 3 wherein said preestablished data includes a security marking selected from the list of:

conventional ink, infra-red ink, ultra-violet ink, magnetic ink, isotope tagging, fluorescent ink, holograph marking, silicon chip implant or watermarking.

6. The invention set forth in claim 1 further including:

means for dispensing printed ones of said printable stock to said user.

7. The invention set forth in claim 6 wherein the printed data on said stock is in the form of a money order containing the name of the payee.

8. The invention set forth in claim 6 wherein one of said document types is a sheet of postage indicia wherein the printed data on said stock is in the form of a plurality of postage stamps containing a selected value.

9. The invention set forth in claim 8 wherein said unique data is preestablished on said stock and includes a security marking selected from the list of:

conventional ink, infra-red ink, ultra-violet ink, magnetic ink, isotope tagging, fluorescent ink, holograph marking, silicon chip implant or watermarking.

10. The invention set forth in claim 6 wherein one of said document types is a money order.

11. The invention set forth in claim 10 wherein said unique data is preestablished on said stock and includes a security marking selected from the list of:

conventional ink, infra-red ink, ultra-violet ink, magnetic ink, isotope tagging, fluorescent ink, holograph marking, silicon chip implant or watermarking.

12. The invention set forth in claim 6 wherein said document types are selected from the list consisting of:

postage stamps, money orders, certified checks, cashier checks, travelers' checks, bank drafts, letters of credit, legal documents, legal certificates, diplomas, passports, birth certificates, visas, drivers licenses, social security cards, medical insurance cards, vacation packages, travel vouchers, car rental vouchers, hotel vouchers, meal vouchers, drink vouchers, food stamps, tickets, baggage tags, prescriptions ($R_x$), vehicle licenses, vehicle titles.

13. The invention set forth in claim 12 further including:
means for dispensing printed ones of said printable stock to said user.

14. A vending machine adapted to create an indicia, said vending machine comprising:
means for interacting with a user to establish a credit value on a document;
means for accepting from a particular printable stock associated with said document data unique to said document;
means for comparing said accepted data with data stored in a data base to determine if said unique data had been previously accepted; and
means operable under control of said comparing means for providing a set of coded control data for printing on said printable stock, said control data being decodable, in part, under control of key data associated on said printable stock with said unique data.

15. The invention set forth in claim 14 wherein at least a portion of said unique data is preestablished on said printable stock.

16. The invention set forth in claim 15 wherein said preestablished data includes at least one of the following:
conventional ink, infra-red ink, ultra-violet ink, magnetic ink, isotope tagging, fluorescent ink, holograph marking, silicon chip implant or watermarking.

17. The invention set forth in claim 15 wherein said preestablished data includes a security marking selected from the list of:
conventional ink, infra-red ink, ultra-violet ink, magnetic ink, isotope tagging, fluorescent ink, holograph marking, silicon chip implant or watermarking.

18. The stock of claim 14 further including:
means for dispensing printed ones of said printable stock to said user.

19. The invention set forth in claim 18 wherein one of said document types is a sheet of postage indicia wherein the printed data on said stock is in the form of a plurality of postage stamps containing a selected value.

20. The invention set forth in claim 18 wherein one of said document types is a money order.

21. The invention set forth in claim 20 wherein said unique data is preestablished on said stock and includes a security marking selected from the list of:
conventional ink, infra-red ink, ultra-violet ink, magnetic ink, isotope tagging, fluorescent ink, holograph marking, silicon chip implant or watermarking.

22. The invention set forth in claim 18 wherein said document types are selected from the list consisting of:
postage stamps, money orders, certified checks, cashier checks, travelers' checks, bank drafts, letters of credit, legal documents, legal certificates, diplomas, passports, birth certificates, visas, drivers licenses, social security cards, medical insurance cards, vacation packages, travel vouchers, car rental vouchers, hotel vouchers, meal vouchers, drink vouchers, food stamps, tickets, baggage tags, prescriptions ($R_x$), vehicle licenses, vehicle titles.

23. The invention set forth in claim 22 further including:
means for dispensing printed ones of said printable stock to said user.

24. A method for establishing the validity of a display created by a non-secure printer, said method comprising the steps of:
placing in said printer paper upon which information may be created, said paper containing preestablished data which is unique to said paper; and
communicating at least a portion of said preestablished data to a location independent from said printer, said independent location operable to send to said printer a security indicia, as part of a human readable display, said security indicia created in part by information contained in said preestablished media data and whereby said security indicia is validatable at a subsequent time partially under control of data contained in said preestablished paper data, said unique data being created on said paper using one or more of the following methods:
conventional ink, infra-red ink, ultra-violet ink, magnetic ink, isotope tagging, fluorescent ink, holograph marking, silicon chip implant or watermarking;
wherein said paper is divided into sections, each section adapted for printing thereon information pertaining to a different display, each such display having associated therewith a security indicia.

25. The method of claim 24 wherein the security portion of each said identical display is different.

26. The method of claim 24 wherein the security portion of each said identical display is the same.

27. The method of claim 24 wherein the sections control the delivery of mail pieces when said security indicia is created thereon.

28. The method of claim 24 wherein each said display is generated from the same preestablished data.

29. The method of claim 28 wherein the human readable portion of each said display is identical to all the other human readable displays on the media.

30. The method of claim 24 wherein the security portion of each display includes a portion of said preestablished data.

31. The method of claim 30 wherein said security portion has at least one section created from the following list:
conventional ink, infra-red ink, ultra-violet ink, magnetic ink, isotope tagging, fluorescent ink, holograph marking, silicon chip implant or watermarking.

32. The method of claim 24 wherein the media is paper and wherein the security indicia includes the monetary amount available to a holder of the paper.

33. The method of claim 32 wherein said security portion has at least one section created from the following list:
conventional ink, infra-red ink, ultra-violet ink, magnetic ink, isotope tagging, fluorescent ink, holograph marking, silicon chip implant or watermarking.

34. The method of claim 32 wherein the security indicia includes a human readable portion which contains financial information.

35. The method of claim 32 wherein said financial information includes information sufficient to create a money order.

36. A method for establishing the validity of a display created by a non-secure printer, said method comprising the steps of:
placing in said printer paper upon which information may be created, said paper containing preestablished data which is unique to said paper;

communicating at least a portion of said preestablished data to a location independent from said printer, said independent location operable to send to said printer a security indicia, as part of a human readable display, said security indicia created in part by information contained in said preestablished media data and whereby said security indicia is validatable at a subsequent time partially under control of data contained in said preestablished paper data, said unique data being created on said paper which is part of a form defining one or more from the group consisting of:

postage stamps, money orders, certified checks, cashier checks, travelers' checks, bank drafts, letters of credit, legal documents, legal certificates, diplomas, passports, birth certificates, visas, drivers licenses, social security cards, medical insurance cards, vacation packages, travel vouchers, car rental vouchers, hotel vouchers, meal vouchers, drink vouchers, food stamps, tickets, baggage tags, prescriptions (Rx), vehicle licenses, vehicle titles;

wherein said paper is divided into sections, each section adapted for printing thereon information pertaining to a different display, each such display having associated therewith a security indicia.

37. The method of claim 36 wherein said security indicia is created from one or more of the following:

conventional ink, infra-red ink, ultra-violet ink, magnetic ink, isotope tagging, fluorescent ink, holograph marking, silicon chip implant or watermarking.

38. The method of claim 36 wherein each said display is generated from the same preestablished data.

39. The method of claim 36 wherein the human readable portion of each said display is identical to all the other human readable displays on the media.

40. The method of claim 36 wherein the security portion of each said identical display is different.

41. The method of claim 36 wherein the security portion of each said identical display is the same.

42. The method of claim 36 wherein the sections control the delivery of mail pieces when said security indicia is created thereon.

43. The method of claim 36 wherein the security indicia includes the monetary amount available to a holder of the media.

44. The method of claim 43 wherein said security indicia is created from one or more of the following:

conventional ink, infra-red ink, ultra-violet ink, magnetic ink, isotope tagging, fluorescent ink, holograph marking, silicon chip implant or watermarking.

45. The method of claim 43 wherein the security indicia includes a human readable portion which contains financial information.

46. The method of claim 45 wherein said financial information includes information sufficient to create a money order.

47. A system adapted to create an indicia, said system comprising:

means for interacting with a user to establish a credit value on a document;

means for accepting from a particular printable stock associated with said document data unique to said particular form;

means for comparing said accepted data with data stored in a data base to determine if said unique data had been previously accepted; and means operable under control of said comparing means for providing a set of coded control data for printing on said printable stock, said control data being decodable, in part, under control of key data associated on said printable stock with said unique data wherein said document is a blank sheet adapted to print postage stamps thereon and wherein said control data is associated with postage printed concurrently with said unique data, wherein said document is a blank sheet adapted to print postage stamps thereon and wherein said control data is associated with postage concurrently printed thereon.

48. The system set forth in claim 47 wherein said preestablished data includes at least one of the following:

conventional ink, infra-red ink, ultra-violet ink, magnetic ink, isotope tagging, fluorescent ink, holograph marking, silicon chip implant or watermarking.

49. The system set forth in claim 47 wherein said credit value is the identity of the said user.

50. The system set forth in claim 47 wherein said credit value is a monetary value created on said stock under control of said accepting means.

51. The system set forth in claim 47 wherein at least a portion of said unique data is preestablished on said printable stock.

52. The system set forth in claim 51 wherein said preestablished data includes a security portion.

53. The system set forth in claim 52 wherein said security portion is at least one of the types selected from the list of:

conventional ink, infra-red ink, ultra-violet ink, magnetic ink, isotope tagging, fluorescent ink, holograph marking, silicon chip implant or watermarking.

54. A method of creating on printable stock valuable information the verification of authenticity of which at a subsequent point of use is necessary, said method comprising the steps of:

interacting with a user to establish a user credit value;

accepting from a particular printable stock associated data unique to said particular stock;

comparing said accepted data with data stored in a data base to determine if said unique data had been previously accepted;

providing, under control of said comparing step, said valuable information as well as a set of coded control data for printing on said particular printable stock, said control data being decodable, in part, under control of key data associated on said particular printable stock with said unique data, such that said valuable information can be verified at said point of use, said valuable information including at least said user credit value, wherein said document is a blank sheet adapted to print postage stamps thereon and wherein said control data is associated with postage concurrently printed thereon.

55. The invention set forth in claim 54 wherein said preestablished data includes at least one of the following:

conventional ink, infra-red ink, ultra-violet ink, magnetic ink, isotope tagging, fluorescent ink, holograph marking, silicon chip implant or watermarking.

56. The invention set forth in claim 54 wherein at least a portion of said unique data is embedded within the printable stock.

57. The invention set forth in claim 56 wherein said preestablished data includes a security portion.

58. The invention set forth in claim 57 wherein said security portion is at least one of the types selected from the list of:

conventional ink, infra-red ink, ultra-violet ink, magnetic ink, isotope tagging, fluorescent ink, holograph marking, silicon chip implant or watermarking.

59. A method of creating a document, wherein authenticity of the document will be verified at a time subsequent to creation of the document, comprising:

receiving a specified amount of financial credit from a consumer;

receiving information from said consumer that identifies a payee for said specified amount of financial credit;

receiving a unique identifier from a stock, wherein said unique identifier comprises an encryption key;

creating authentication information, wherein said authentication information is used by the consumer to complete a financial transaction;

encrypting said authentication information utilizing said encryption key; and communicating said encrypted authentication information to be printed on said stock.

60. The method of claim 59 further comprising:

completing payment of said specified amount of financial value to said payee.

61. The method of claim 59 further comprising:

debiting the specified amount of financial value from an account maintained by the consumer.

62. The method of claim 59 wherein said step of receiving a specified amount is performed by an intermediary via the Internet.

63. The method of claim 59 wherein said step of receiving a specified amount is performed by a vending device.

64. The method of claim 59 wherein said authentication information is encoded in a machine-readable format.

65. The method of claim 64 wherein said machine-readable format is a bar code.

66. A system for creating a document, wherein authenticity of the document will be verified at a time subsequent to creation of the document, comprising:

means for receiving a specified amount of financial credit from a consumer;

means for receiving information from said consumer that identifies a payee for said specified amount of financial credit;

means for receiving a unique identifier from a stock, wherein said unique identifier comprises an encryption key;

means for creating authentication information, wherein said authentication information includes information pertaining to a financial transaction;

means for encrypting said authentication information utilizing said encryption key; and means for communicating said encrypted authentication information to be printed on said stock.

67. The system of claim 66 wherein said means for of receiving a specified amount receives communication of said specified amount via the Internet.

68. The system of claim 66 wherein said means for receiving a specified amount receives communication of said specified amount via a user interface of a vending device.

69. The system of claim 66 wherein said authentication information is encoded in a machine-readable format.

70. The system of claim 69 wherein said machine-readable format is a bar code.

* * * * *

(12) EX PARTE REEXAMINATION CERTIFICATE (8245th)
United States Patent
Kara

(10) Number: US 6,505,179 C1
(45) Certificate Issued: May 17, 2011

(54) VERIFYING THE AUTHENTICITY OF PRINTED DOCUMENTS ON UNIVERSALLY AVAILABLE PAPER STOCK

(75) Inventor: Salim G. Kara, Thornhill (CA)

(73) Assignee: Kara Technology Incorporated, Houston, TX (US)

Reexamination Request:
No. 90/009,682, Feb. 8, 2010

Reexamination Certificate for:
Patent No.: 6,505,179
Issued: Jan. 7, 2003
Appl. No.: 09/345,617
Filed: Jun. 30, 1999

Related U.S. Application Data

(63) Continuation-in-part of application No. 09/324,241, filed on Jun. 2, 1999, now Pat. No. 6,735,575.

(51) Int. Cl.
*G06F 21/00* (2006.01)

(52) U.S. Cl. .............................. 705/50; 101/71; 283/53; 283/71; 283/72; 283/73; 283/80; 283/81

(58) Field of Classification Search ........................ None

See application file for complete search history.

(56) References Cited

U.S. PATENT DOCUMENTS

| | | | |
|---|---|---|---|
| 3,990,558 | A | 11/1976 | Ehrat |
| 5,432,506 | A | 7/1995 | Chapman |
| 5,489,096 | A | 2/1996 | Aron |
| 5,772,510 | A | 6/1998 | Roberts |
| 6,111,953 | A | 8/2000 | Walker et al. |
| 6,170,744 | B1 | 1/2001 | Lee et al. |
| 6,208,980 | B1 | 3/2001 | Kara |
| 6,249,777 | B1 | 6/2001 | Kara et al. |

*Primary Examiner*—Joseph R. Pokrzywa

(57) ABSTRACT

Universally available preprinted forms are used in a general purpose printing device to allow for the subsequent verification of the authenticity of a printed document such as a ticket, stamp, check, or money order. In operation, the user accesses the seller of the goods/services and during an information exchange with the seller there is inputted at least a portion of the preprinted data from the form. The seller then uses this information to formulate a printable control indicia which is then printed on the form at the user's location. When the form is subsequently presented to the seller, for example when the user uses the form he/she printed, the preprinted portion of the form is used to obtain a decipher key which in turn is used to decipher the control indica. If desired, a special security marking may be associated with the form for additional security. Inability to decode the control indicia indicates that the printed material on the form may not be authentic. A vending machine is shown in one embodiment.

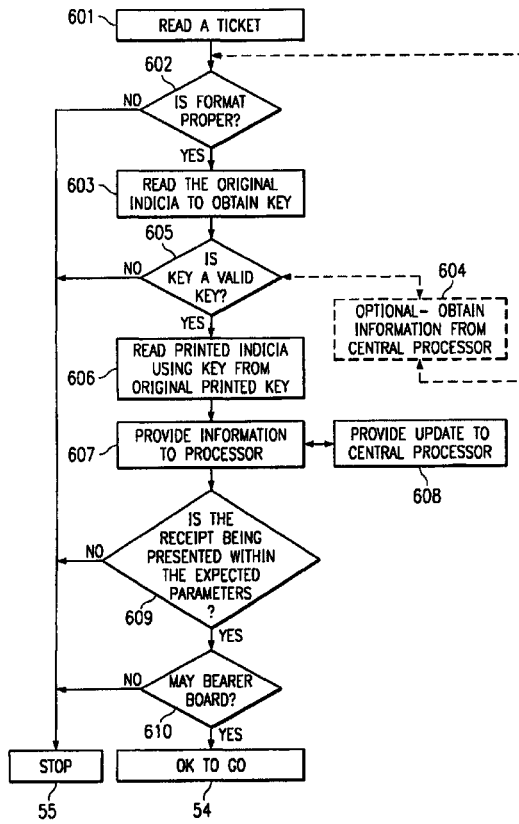

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 24, 27-31, 36-39, 42 and 44 are cancelled.
Claims 1-23, 25, 26, 32-35, 40, 41, 43 and 45-70 were not reexamined.

\* \* \* \* \*